United States Patent … US 12,012,995 B2
Kenworthy et al. … Date of Patent: Jun. 18, 2024

(54) SPLIT PLUMMER BLOCK BEARING HOUSING

(71) Applicant: SKF AUSTRALIA PTY LTD, Oakleigh (AU)

(72) Inventors: Darren Kenworthy, Caulfield North (AU); Ramesh Varadarajan, Cranbourne North (AU)

(73) Assignee: SKF AUSTRALIA PTY LTD, Oakleigh (AU)

( * ) Notice: Subject to any disclaimer, the term of this patent is extended or adjusted under 35 U.S.C. 154(b) by 270 days.

(21) Appl. No.: 17/609,029

(22) PCT Filed: May 15, 2020

(86) PCT No.: PCT/AU2020/050480
§ 371 (c)(1),
(2) Date: Nov. 5, 2021

(87) PCT Pub. No.: WO2020/227778
PCT Pub. Date: Nov. 19, 2020

(65) Prior Publication Data
US 2022/0213930 A1    Jul. 7, 2022

(30) Foreign Application Priority Data
May 16, 2019    (DE) .......................... 102019207156.2

(51) Int. Cl.
F16C 33/80    (2006.01)
F16C 35/04    (2006.01)
F16J 15/447    (2006.01)

(52) U.S. Cl.
CPC .......... F16C 33/805 (2013.01); F16C 35/047 (2013.01); F16C 2326/58 (2013.01); F16J 15/4476 (2013.01)

(58) Field of Classification Search
CPC ...... F16C 33/78; F16C 33/7886; F16C 33/80; F16C 33/805; F16J 15/32; F16J 15/324; F16J 15/3204; F16J 15/4476
See application file for complete search history.

(56) References Cited

U.S. PATENT DOCUMENTS 2,740,647 A * 4/1956 Van Pelt .................. F16C 33/80
277/420
8,714,559 B2 * 5/2014 Hoeting ............... F16J 15/4478
277/408
2019/0360597 A1 11/2019 Tsumori

FOREIGN PATENT DOCUMENTS

AU    2009217408 A1    4/2010
CA    2215174 A1    3/1998
(Continued)

OTHER PUBLICATIONS

Translaton of DE3717571 obtained Oct. 10, 2023.*
(Continued)

*Primary Examiner* — James Pilkington
(74) *Attorney, Agent, or Firm* — J-TEK LAW PLLC; Scott T. Wakeman; Mark A. Ussai

(57) ABSTRACT

A split plummer block bearing housing for a rotatable shaft includes a detachable housing cap, which includes at least one housing grease channel, and at least one seal assembly. The seal assembly includes a stationary part, which has a seal grease channel and is mounted on the housing, and a rotating part that is configured to be mounted on the shaft. The stationary part and the rotating part are configured to cooperate with each other as a labyrinth and/or contacting seal, and the housing grease channel and the seal grease channel connect and form an extension of each other.

12 Claims, 3 Drawing Sheets

(56) References Cited

FOREIGN PATENT DOCUMENTS

| | | | |
|---|---|---|---|
| CN | 204493729 U | | 7/2015 |
| DE | 3717571 | * | 6/1988 |
| WO | 2017026300 A1 | | 2/2017 |

OTHER PUBLICATIONS

International Search Report and Written Opinion of the International Searching Authority in PCT/AU2020/050480 dispatched Nov. 19, 2020.
Office Action from the Taiwanese Patent Office dispatched Aug. 22, 2023 in related application No. 109111607, and translation thereof.

* cited by examiner

SPLIT PLUMMER BLOCK BEARING HOUSING

This application is the U.S. National Stage of International Application No. PCT/AU2020/050480 filed on May 15, 2020, which claims priority from German Application No. 102019207156.2 filed on 16 May 2019, the contents of which are incorporated herein by this reference.

TECHNICAL FIELD

This invention relates to a split plummer block bearing housing for a rotatable shaft. The split plummer block bearing housing comprises a seal assembly.

BACKGROUND

Conveyor pulleys are used in various industries, for instance for conveyor belts in the mining industry. Conveyor pulleys, especially for heavy duty applications such as mining, are rotationally supported by bearings mounted in a housing. Conveyor pulleys are mounted in a system where many conveyor pulleys are supporting for instance a conveyor belt for transporting coal or iron ore in the mining industry. As such, the conveyor pulleys and the housings are exposed to a lot of contaminants that can cause bearing failure, thus service and change of the bearings is needed at times. Downtime in a transportation system to service, or even worse, to replace a bearing after an unplanned failure, is very costly.

An object of the invention is to further improve this.

SUMMARY OF THE INVENTION

It is also a cognition of this invention that there are solutions where seal assemblies are mounted on the side of the housing to reduce the amount of contaminants entering the housing and the bearing. The downside is that the housings become bigger in size and width, which means that the bearing is placed further away from the face of the pulley drum. With an increased distance between the bearing and the load carrying pulley drum, any given applied load, that increases the bending moments in the shaft, causes stresses, resulting in a need for larger and more expensive components for increased robustness to carry the load and bending stress. The solution according to the present invention extends the service life of pulley bearings, reduces the rate of bearing failures due to contamination, while remaining compact in size and width. Further, the invention also simplifies the process for changing bearings in-situ on conveyor, while avoiding failures of bearing due to poor installation An object of the invention has been achieved by providing a split plummer block bearing housing for rotating shafts, such as a shaft for conveyor pulleys. The split plummer block bearing housing presents a detachable housing cap having at least one housing grease channel, and at least one seal assembly. The housing grease channel is made to transport grease through the housing cap into the interior part of the housing. The at least one seal assembly comprises a stationary part mounted on the housing and a rotating part intended to be mounted on a shaft. The stationary part has a seal grease channel intended to transport grease into the seal assembly. The stationary part and the rotating part further forms labyrinth shaped portions interacting to form a sealing effect in a non-contacting manner. The seal assembly further has sealing means putting the stationary part and the rotating part in physical contact with each other. The sealing means can be a flinger attached to either of the static or rotating part reaching towards and abutting the other part. The at least one seal assembly is mounted in a recess on the axial side of the housing so that the housing grease channel and the seal grease channel connects through a channel connection point. By providing this split plummer block bearing housing, grease can easily be filled from the outside into the seal assembly, increasing the lubricating properties and the sealing effect by the grease, thus increasing service life. At the same time, as the grease channels connect with each other from the housing cap, the grease refilling is not only easily accessible from the top of the housing, but by having the grease channel from the top of the housing cap and not separately on the seal assembly directly, the width of the split plummer block bearing housing can be reduced, meaning the bearing can be positioned closer to the loaded point of the shaft, for instance closer to the end phase of a conveyor pulley, this in turn reducing the bending forces and stresses in the bearing created from forces acting on the shaft.

The housing cap is made in one piece, i.e. an attached seal assembly to the housing cap is not to be interpreted as a housing cap. By being detachable, the housing cap can be both fixed and detached using for instance bolts. This is beneficial while servicing the bearing or changing the conveyor pulley as it becomes easier to detach the shaft and bearing from the housing. The at least one housing grease channel is a channel to supply grease from the radial exterior side to the radial interior side of the housing. As an example, there can be a connection point for a grease gun at the radial top of the housing cap where it is easily accessible, where the grease is lead to the inside of the housing through the at least one housing grease channel.

The "radial direction" is a direction substantially perpendicular from the axial extension of the shaft, and the "radial exterior side" is the side furthest away from the shaft, and the "radial interior side" is the side closest to the shaft. The "radial top" is the radial exterior side furthest away from the shaft in a substantially opposite direction to the force of gravity.

The split plummer block bearing housing can have an asymmetrical body where the width is minimized at an inboard side, such that, together with the recessed seal design feature, the effective distance from the bearing assembly center-line to the face of the conveyor pulley drum is minimized. Further the housing body opening diameter can be maximized to enable insertion of a standard hydraulic nut, thereby facilitating installation and/or removal of the bearing itself whilst encapsulated in the housing body.

In an embodiment of the split plummer block bearing housing, the seal assembly's labyrinth shaped portions extend in a radial direction. This is beneficial for the housing to remain compact.

In an embodiment of the split plummer block bearing housing, the housing grease channel and the seal grease channel are directed in a substantially radial direction. This is beneficial to make the split plummer block bearing housing compact in width, and to make the grease channel short, robust and easy to fill with grease. This is further beneficial when manufacturing the housing and seal assembly, where it is possible to either drill or cast an uncomplicated grease channel.

The housing cap can have two housing grease channels leading grease to seal assemblies on both sides of the housing.

The housing cap can also have three housing grease channels leading grease to seal assemblies on both sides of the housing as well as into the bearing via a lubrication groove on the radial outer side of the outer ring, having bearing grease channels connecting the groove to the inside of the bearing.

The housing cap can as a further example have two housing grease channels leading grease to a seal assembly on one side of the housing and to the bearing. This can be relevant in the case where the pulley shaft is connected on one side of the housing only, leaving the other side completely sealed or capped as no rotation occurs.

In a further example, the housing cap can have one housing grease channel leading grease only to a closed cavity at the outboard side of the housing and subsequently through the bearing in the axial direction and subsequently to the seal assembly at the inboard side of the housing. This can be relevant in the case where the pulley shaft is connected on one side of the housing only, leaving the other side completely sealed or capped as no rotation occurs.

In an embodiment of the split plummer block bearing housing, the channel connection point has sealing rings in between the seal assembly and housing cap, such as o-rings or quad rings. This is beneficial to prevent leakage of grease into other areas, thus reducing the amount of grease consumed and securing the effectiveness of the seal assembly by ensuring the grease is transported to the inside of the seal assembly and to the labyrinth shaped portions.

In a further embodiment of the split plummer block bearing housing, the seal assembly is un-split. This is beneficial to simplify handling, ensure proper sealing effect, and to prevent mounting errors.

BRIEF DESCRIPTION OF DRAWINGS

Exemplifying embodiments will now be described more in detail with reference to accompanying drawings, wherein.

DETAILED DESCRIPTION OF THE DRAWINGS

Figure 1:
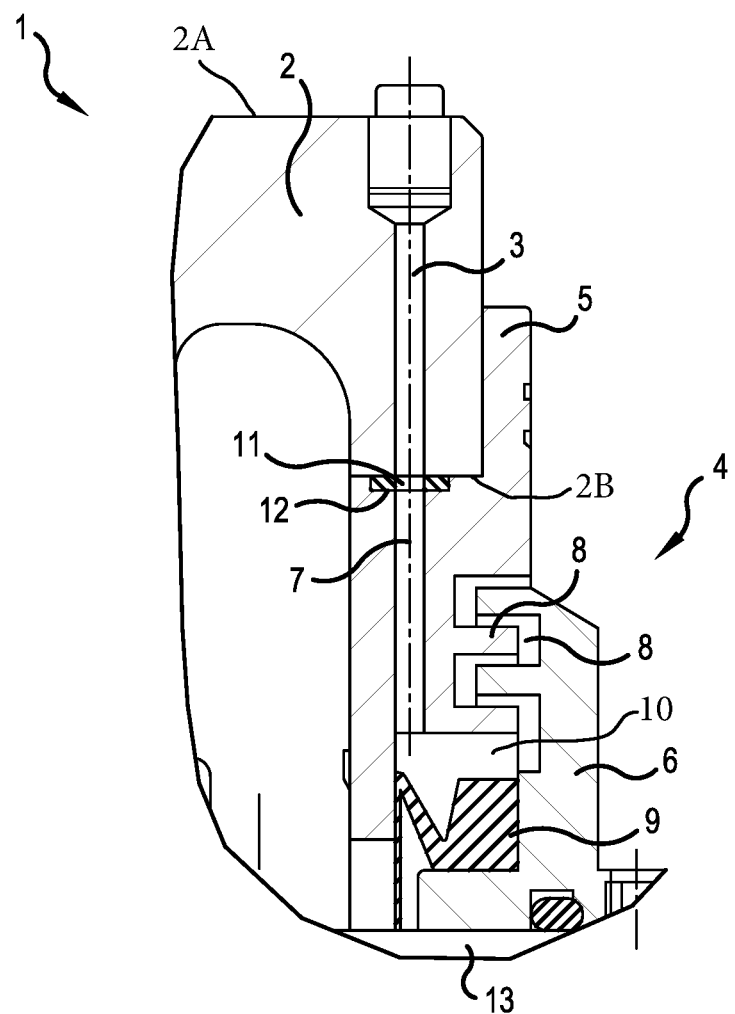
FIG. 1 shows a cross section of a split plummer block bearing housing according to the invention.

FIG. 1 shows a cross section of a split plummer block bearing housing 1 according to the invention. The split plummer block bearing housing 1 for conveyor pulleys has a detachable housing cap 2 having at least one housing grease channel 3 that extends from a radially exterior side 2A of the housing cap 2 to a radially inner surface 2B of the housing cap 2. An at least one seal assembly 4 comprises a stationary part 5 mounted on the housing 1 and a rotating part 6 intended to be mounted on a shaft 13. The stationary part 5 has a seal grease channel 7. The stationary part 5 and the rotating part 6 forms labyrinth shaped portions 8, and a seal body 9 is located in a seal chamber 10 axially between the housing cap 2 and the rotating part 6. The at least one seal assembly 4 is mounted in an opening on the axial side of the housing 1. The housing grease channel 3 and the seal grease channel 7 connects through a channel connection point 11. The housing grease channel 3 and the seal grease channel 7 are directed in a substantially radial direction. The channel connection point 11 has sealing rings 12 in between the seal assembly 4 and housing cap 2, such as o-rings or quad rings.

Figure 2:
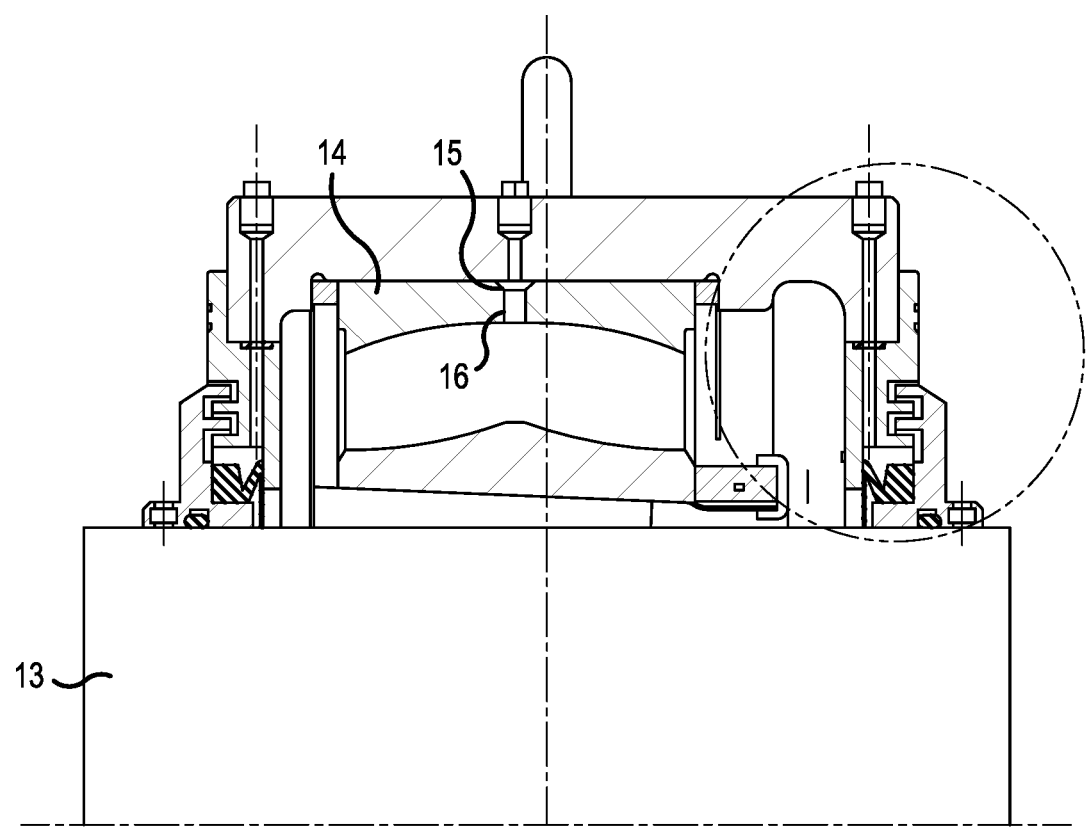
FIG. 2 shows a cross section of a bearing mounted in a split plummer block bearing housing according to the invention.

FIG. 2 shows a cross section of a bearing 14 mounted in a split plummer block bearing housing 1 according to the invention. The split plummer block bearing housing 1 has sealing assemblies 4 on both sides and a third housing grease channel 3 connecting to the lubrication groove 15 in the radial outer side of the outer bearing ring, for further transportation to the bearing interior through the bearing grease channels 16. The figure shows a spherical roller bearing (SRB) which is particularly beneficial in conveyor pulleys, but it could also be other bearing types more suitable to the application, such as a cylindrical roller bearing (CRB), a tapered roller bearing (TRB), a toroidal bearing, a deep-groove ball bearing, etc. The spherical roller bearing in the figure is sealed, which further enhances the sealing properties to reduce contaminants and debris entering the bearing.

Figure 3:
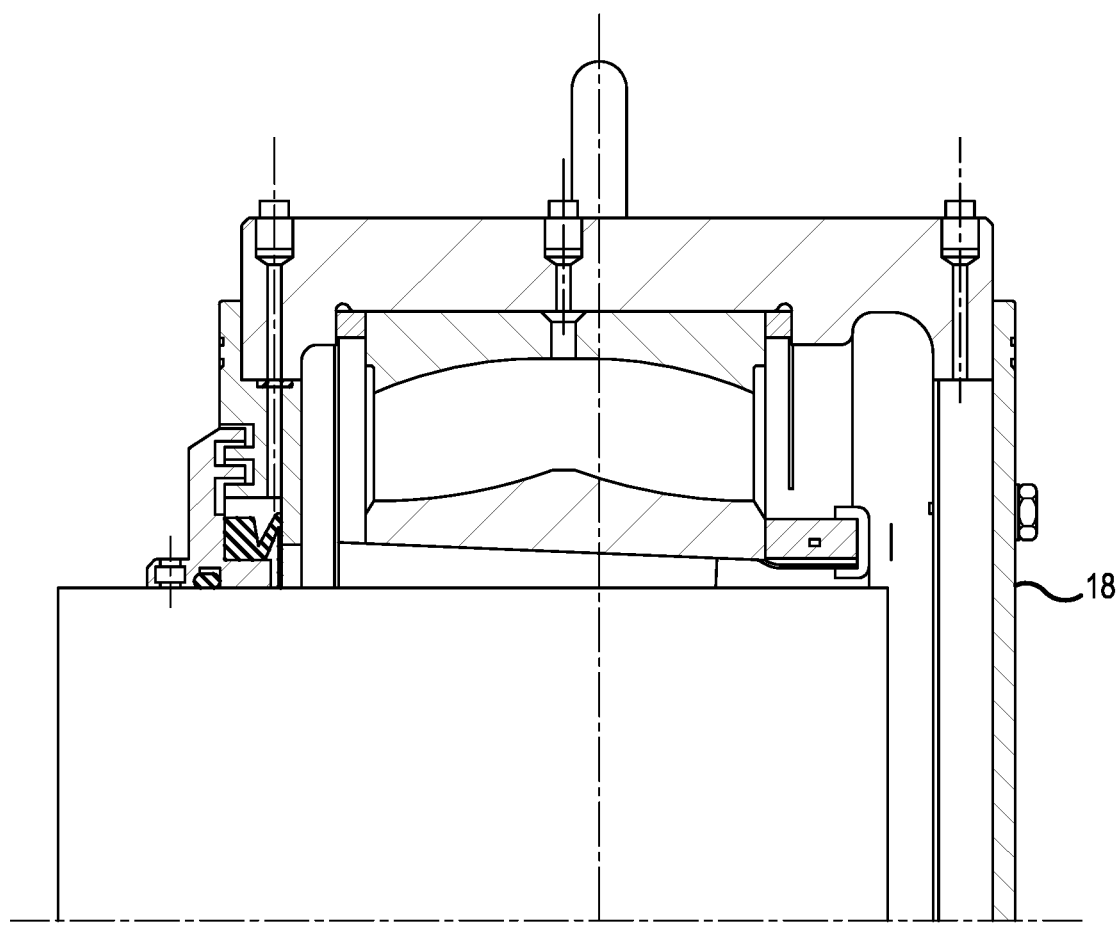
FIG. 3 shows a cross section of a bearing mounted in a split plummer block bearing housing according to the invention.

FIG. 3 shows a cross section of a bearing 14 mounted in a split plummer block bearing housing 1 according to the invention, where one axial side of the split plummer block bearing housing 1 is sealed by an axial cap 18. There is still a third inactive housing grease channel 3 portrayed in the figure leading down to the axial cap 18, but it could of course also be taken away completely to reduce machining cost.

Although the present invention has been described according to a number of preferred embodiments, the examples given are not exhaustive. It will be appreciated by those skilled in the art that additions, deletions, modifications, and substitutions not specifically described herein may be made without departing from the invention as defined in the appended claims.

A reference herein to a patent document or any other matter identified as prior art, is not to be taken as an admission that the document or other matter was known or that the information it contains was part of the common general knowledge as at the priority date of any of the claims.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

The invention claimed is:

1. A split plummer block bearing housing for a rotatable shaft, comprising:
   a detachable housing cap having at least one housing grease channel, and
   at least one seal assembly,
   wherein the at least one seal assembly comprises:
      a stationary part mounted on the housing cap, and having a seal grease channel,
      a rotating part configured to be mounted on the shaft, and
      a seal body in a seal chamber defined by the stationary part and the rotating part,
   wherein the stationary part and the rotating part are configured to cooperate with each other as a labyrinth and/or contacting seal,
   wherein the housing grease channel and the seal grease channel connect and form an extension of each other,
   wherein the housing grease channel extends radially and linearly from a radial exterior side of the housing cap to a radially inner surface of the housing cap, and wherein the seal grease channel extends radially and linearly from a radial outer surface of the stationary part to the seal chamber.

2. The split plummer block bearing housing according to claim 1, wherein the at least one seal assembly is mounted in an opening in an axial side of the housing.

3. The split plummer block bearing housing according to claim 1, including a sealing ring at an area where the housing grease channel and the seal grease channel connect.

4. The split plummer block bearing housing according to claim 3,
wherein the sealing ring comprises an o-ring and/or a quad ring.

5. The split plummer block bearing housing according to claim 1,
wherein the housing grease channel and the seal grease channel are coaxial.

6. The split plummer block bearing housing according to claim 1,
wherein the stationary part includes a flange parallel to the housing grease channel, and
wherein the flange overlies an axial outer side of the housing cap.

7. The split plummer block bearing housing according to claim 1,
wherein the housing grease channel and the seal grease channel are coaxial,
wherein the stationary part includes a flange parallel to the housing grease channel, and
wherein the flange overlies an axial outer side of the housing cap.

8. A conveyor pulley assembly comprising a split plummer block bearing housing according to claim 1.

9. A split plummer block bearing housing for a rotatable shaft, comprising:
a detachable housing cap having at least one housing grease channel, and
at least one seal assembly,
wherein the at least one seal assembly comprises:
a stationary part having a seal grease channel,
a rotating part configured to be mounted on the shaft, and
a seal body in a seal chamber defined by the stationary part and the rotating part,
wherein the housing cap is mounted to a radially outer portion of the stationary part such that a joint is formed between the housing cap and the stationary part,
wherein the stationary part and the rotating part cooperate with each to form a labyrinth seal,
wherein the housing grease channel includes a radial outer end at a radially exterior side of the housing cap and a radial inner end,
wherein the seal grease channel includes a radial outer end facing the radial inner end of the housing grease channel,
wherein the seal grease channel is in fluid communication with the housing grease channel and forms an extension of the housing grease channel,
wherein the housing grease channel extends linearly from the radial exterior side of the housing cap to a radially interior side of the housing cap, and
wherein the seal grease channel extends linearly from a radial outer surface of the stationary part to the seal chamber.

10. The split plummer block bearing housing according to claim 9,
wherein the housing grease channel and the seal grease channel are coaxial.

11. The split plummer block bearing housing according to claim 9,
wherein the stationary part includes a flange parallel to the housing grease channel, and
wherein the flange overlies an axial outer side of the housing cap.

12. The split plummer block bearing housing according to claim 9,
wherein the housing grease channel extends radially and linearly, and
wherein the seal grease channel extends radially and linearly.

* * * * *